(12) United States Patent
Wood et al.

(10) Patent No.: US 9,087,196 B2
(45) Date of Patent: Jul. 21, 2015

(54) SECURE APPLICATION ATTESTATION USING DYNAMIC MEASUREMENT KERNELS

(75) Inventors: Matthew D. Wood, Portland, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 12/978,457

(22) Filed: Dec. 24, 2010

(65) Prior Publication Data

US 2012/0166795 A1   Jun. 28, 2012

(51) Int. Cl.
*H04L 29/06* (2006.01)
*G06F 21/57* (2013.01)

(52) U.S. Cl.
CPC ...................................... *G06F 21/57* (2013.01)

(58) Field of Classification Search
CPC ........................................................ G06F 21/57
USPC ......................................... 713/155, 164, 189
See application file for complete search history.

(56) References Cited

U.S. PATENT DOCUMENTS

| 5,680,547 | A | 10/1997 | Chang |
| 5,815,665 | A | 9/1998 | Teper et al. |
| 5,832,089 | A | 11/1998 | Kravitz et al. |
| 5,872,844 | A | 2/1999 | Yacobi |
| 5,901,229 | A | 5/1999 | Fujisaki et al. |
| 5,953,422 | A | 9/1999 | Angelo et al. |
| 5,987,131 | A | 11/1999 | Clapp |
| 5,999,627 | A | 12/1999 | Lee et al. |
| 6,138,239 | A | 10/2000 | Veil |
| 6,473,508 | B1 | 10/2002 | Young et al. |
| 6,473,800 | B1 | 10/2002 | Jerger et al. |
| 6,725,373 | B2* | 4/2004 | Carbajal et al. ............... 713/179 |
| 6,871,276 | B1 | 3/2005 | Simon |
| 6,898,710 | B1* | 5/2005 | Aull ............................. 713/182 |
| 6,959,086 | B2 | 10/2005 | Ober et al. |
| 6,988,250 | B1 | 1/2006 | Proudler et al. |
| 6,990,579 | B1* | 1/2006 | Herbert et al. ............... 713/164 |
| 6,996,710 | B1* | 2/2006 | Ellison et al. ................ 713/156 |
| 7,013,481 | B1* | 3/2006 | Ellison et al. ..................... 726/4 |

(Continued)

FOREIGN PATENT DOCUMENTS

| TW | 200805970 A | 1/2008 |
| WO | 2012/088029 A2 | 6/2012 |
| WO | 2012/088029 A3 | 9/2012 |

OTHER PUBLICATIONS

International Search Report and L Witten Opinion Received for the PCT Patent Application No. PCT/US2011/066014, mailed on Jul. 31, 2012, 8 pages.

(Continued)

*Primary Examiner* — David Garcia Cervetti
(74) *Attorney, Agent, or Firm* — Alpine Technology Law Group LLC

(57) ABSTRACT

Methods and apparatus to provide secure application attestation using dynamic measurement kernels are described. In some embodiments, secure application attestation is provided by using dynamic measurement kernels. In various embodiments, P-MAPS (Processor-Measured Application Protection Service), Secure Enclaves (SE), and/or combinations thereof may be used to provide dynamic measurement kernels to support secure application attestation. Other embodiments are also described.

28 Claims, 7 Drawing Sheets

(56) References Cited

U.S. PATENT DOCUMENTS

| | | | |
|---|---|---|---|
| 7,028,149 B2 | 4/2006 | Grawrock et al. | |
| 7,103,529 B2* | 9/2006 | Zimmer | 703/27 |
| 7,103,771 B2* | 9/2006 | Grawrock | 713/155 |
| 7,107,463 B2* | 9/2006 | England et al. | 713/193 |
| 7,137,004 B2* | 11/2006 | England et al. | 713/176 |
| 7,159,240 B2* | 1/2007 | England et al. | 726/6 |
| 7,165,181 B2 | 1/2007 | Brickell | |
| 7,194,634 B2* | 3/2007 | Ellison et al. | 713/190 |
| 7,254,707 B2* | 8/2007 | Herbert et al. | 713/164 |
| 7,305,534 B2* | 12/2007 | Watt et al. | 711/163 |
| 7,340,573 B2* | 3/2008 | Watt | 711/163 |
| 7,363,491 B2* | 4/2008 | O'Connor | 713/166 |
| 7,424,610 B2* | 9/2008 | Ranganathan | 713/164 |
| 7,487,367 B2* | 2/2009 | Belnet et al. | 713/194 |
| 7,587,607 B2* | 9/2009 | Brickell et al. | 713/182 |
| 7,590,867 B2* | 9/2009 | Scarlata et al. | 713/193 |
| 7,634,661 B2* | 12/2009 | England et al. | 713/176 |
| 7,797,544 B2* | 9/2010 | Dillaway et al. | 713/179 |
| 7,827,550 B2* | 11/2010 | Daruwala et al. | 718/1 |
| 7,882,221 B2* | 2/2011 | Sailer et al. | 709/224 |
| 7,979,696 B2* | 7/2011 | Kim et al. | 713/156 |
| 7,984,304 B1* | 7/2011 | Waldspurger et al. | 713/187 |
| 8,060,941 B2* | 11/2011 | Jansen et al. | 726/30 |
| 8,108,536 B1* | 1/2012 | Hernacki et al. | 709/231 |
| 8,161,285 B2* | 4/2012 | Ellison et al. | 713/176 |
| 8,208,637 B2* | 6/2012 | Ellison | 380/278 |
| 8,225,404 B2* | 7/2012 | Freericks et al. | 726/24 |
| 8,327,441 B2* | 12/2012 | Kumar et al. | 726/22 |
| 8,332,928 B2* | 12/2012 | Ibrahim et al. | 726/17 |
| 2002/0004900 A1 | 1/2002 | Patel | |
| 2002/0154782 A1 | 10/2002 | Chow et al. | |
| 2002/0188763 A1* | 12/2002 | Griffin | 709/310 |
| 2003/0002668 A1 | 1/2003 | Graunke et al. | |
| 2003/0028807 A1 | 2/2003 | Lawman et al. | |
| 2003/0037089 A1 | 2/2003 | Cota-Robles et al. | |
| 2003/0037246 A1 | 2/2003 | Goodman et al. | |
| 2003/0061497 A1* | 3/2003 | Zimmer | 713/189 |
| 2003/0093687 A1 | 5/2003 | Westhoff et al. | |
| 2003/0097579 A1* | 5/2003 | England et al. | 713/193 |
| 2003/0112008 A1 | 6/2003 | Hennig | |
| 2003/0115453 A1* | 6/2003 | Grawrock | 713/155 |
| 2003/0188156 A1 | 10/2003 | Yasala et al. | |
| 2003/0226031 A1 | 12/2003 | Proudler et al. | |
| 2003/0226040 A1 | 12/2003 | Challener et al. | |
| 2003/0235175 A1 | 12/2003 | Naghian et al. | |
| 2004/0003288 A1 | 1/2004 | Wiseman et al. | |
| 2004/0103281 A1 | 5/2004 | Brickell | |
| 2004/0172512 A1* | 9/2004 | Nakanishi et al. | 711/162 |
| 2004/0193888 A1 | 9/2004 | Wiseman et al. | |
| 2004/0205341 A1 | 10/2004 | Brickell | |
| 2005/0021968 A1 | 1/2005 | Zimmer et al. | |
| 2005/0033987 A1* | 2/2005 | Yan et al. | 713/201 |
| 2005/0069135 A1 | 3/2005 | Brickell | |
| 2005/0071677 A1 | 3/2005 | Khanna et al. | |
| 2005/0132031 A1* | 6/2005 | Sailer et al. | 709/223 |
| 2005/0132202 A1* | 6/2005 | Dillaway et al. | 713/179 |
| 2005/0137889 A1 | 6/2005 | Wheeler | |
| 2005/0137898 A1 | 6/2005 | Wood et al. | |
| 2005/0138384 A1* | 6/2005 | Brickell et al. | 713/182 |
| 2005/0138423 A1* | 6/2005 | Ranganathan | 713/201 |
| 2005/0144448 A1* | 6/2005 | England et al. | 713/168 |
| 2005/0221766 A1* | 10/2005 | Brizek et al. | 455/73 |
| 2005/0278253 A1* | 12/2005 | Meek et al. | 705/50 |
| 2005/0278477 A1* | 12/2005 | England et al. | 711/100 |
| 2005/0278530 A1* | 12/2005 | England et al. | 713/168 |
| 2005/0278531 A1* | 12/2005 | England et al. | 713/168 |
| 2005/0289347 A1* | 12/2005 | Ovadia | 713/171 |
| 2005/0289351 A1* | 12/2005 | England et al. | 713/180 |
| 2006/0005009 A1* | 1/2006 | Ball et al. | 713/155 |
| 2006/0005230 A1* | 1/2006 | England et al. | 726/1 |
| 2006/0005254 A1* | 1/2006 | Ross | 726/27 |
| 2006/0015719 A1* | 1/2006 | Herbert et al. | 713/164 |
| 2006/0020781 A1* | 1/2006 | Scarlata et al. | 713/100 |
| 2006/0200680 A1* | 9/2006 | Ellison et al. | 713/190 |
| 2006/0236127 A1* | 10/2006 | Kurien et al. | 713/193 |
| 2007/0005992 A1* | 1/2007 | Schluessler et al. | 713/193 |
| 2007/0016766 A1* | 1/2007 | Richmond et al. | 713/100 |
| 2007/0043896 A1* | 2/2007 | Daruwala et al. | 711/6 |
| 2007/0079120 A1* | 4/2007 | Bade et al. | 713/166 |
| 2007/0101401 A1* | 5/2007 | Genty et al. | 726/3 |
| 2007/0174406 A1* | 7/2007 | Morris et al. | 709/207 |
| 2007/0174921 A1* | 7/2007 | England et al. | 726/30 |
| 2007/0179802 A1* | 8/2007 | Buss et al. | 705/1 |
| 2007/0185856 A1* | 8/2007 | Mittal et al. | 707/5 |
| 2007/0235517 A1* | 10/2007 | O'Connor et al. | 235/375 |
| 2008/0015808 A1* | 1/2008 | Wilson et al. | 702/123 |
| 2008/0072066 A1* | 3/2008 | Vogler et al. | 713/187 |
| 2008/0083039 A1* | 4/2008 | Choi et al. | 726/27 |
| 2008/0141024 A1* | 6/2008 | Ranganathan | 713/155 |
| 2008/0141027 A1* | 6/2008 | Kim et al. | 713/156 |
| 2008/0163209 A1* | 7/2008 | Rozas et al. | 718/1 |
| 2008/0178176 A1* | 7/2008 | Berger et al. | 718/1 |
| 2008/0235372 A1* | 9/2008 | Sailer et al. | 709/224 |
| 2008/0235754 A1* | 9/2008 | Wiseman et al. | 726/1 |
| 2008/0235804 A1* | 9/2008 | Bade et al. | 726/26 |
| 2008/0244114 A1* | 10/2008 | Schluessler et al. | 710/24 |
| 2008/0270603 A1* | 10/2008 | Berger et al. | 709/224 |
| 2008/0288783 A1* | 11/2008 | Jansen et al. | 713/189 |
| 2008/0320308 A1* | 12/2008 | Kostiainen et al. | 713/171 |
| 2009/0013181 A1* | 1/2009 | Choi et al. | 713/168 |
| 2009/0038017 A1* | 2/2009 | Durham et al. | 726/27 |
| 2009/0049510 A1* | 2/2009 | Zhang et al. | 726/1 |
| 2009/0064292 A1* | 3/2009 | Carter et al. | 726/5 |
| 2009/0086979 A1* | 4/2009 | Brutch et al. | 380/279 |
| 2009/0138731 A1* | 5/2009 | Jin et al. | 713/194 |
| 2009/0154709 A1* | 6/2009 | Ellison | 380/282 |
| 2009/0169012 A1* | 7/2009 | Smith et al. | 380/277 |
| 2009/0172814 A1* | 7/2009 | Khosravi et al. | 726/23 |
| 2009/0178138 A1* | 7/2009 | Weiss et al. | 726/22 |
| 2009/0204964 A1* | 8/2009 | Foley et al. | 718/1 |
| 2009/0292919 A1* | 11/2009 | England | 713/168 |
| 2009/0319793 A1* | 12/2009 | Zic et al. | 713/172 |
| 2010/0005264 A1* | 1/2010 | Ito et al. | 711/163 |
| 2010/0023743 A1* | 1/2010 | Sastry et al. | 713/2 |
| 2010/0058431 A1* | 3/2010 | McCorkendale et al. | 726/1 |
| 2010/0082984 A1* | 4/2010 | Ellison et al. | 713/170 |
| 2010/0138674 A1* | 6/2010 | Dimitrakos et al. | 713/194 |
| 2010/0205459 A1* | 8/2010 | Schwarz | 713/190 |
| 2011/0145598 A1* | 6/2011 | Smith et al. | 713/190 |
| 2011/0154500 A1* | 6/2011 | Sahita et al. | 726/26 |
| 2011/0154501 A1* | 6/2011 | Banginwar et al. | 726/26 |
| 2011/0173643 A1* | 7/2011 | Nicolson et al. | 719/328 |
| 2011/0179477 A1* | 7/2011 | Starnes et al. | 726/9 |
| 2011/0213953 A1* | 9/2011 | Challener et al. | 713/2 |
| 2011/0231668 A1* | 9/2011 | Schluessler et al. | 713/187 |
| 2011/0237234 A1* | 9/2011 | Kotani et al. | 455/418 |
| 2011/0239210 A1* | 9/2011 | Kotani et al. | 717/171 |
| 2011/0271090 A1* | 11/2011 | Zimmer et al. | 713/2 |
| 2011/0302415 A1* | 12/2011 | Ahmad et al. | 713/168 |
| 2011/0320823 A1* | 12/2011 | Saroiu et al. | 713/189 |
| 2012/0084850 A1* | 4/2012 | Novak et al. | 726/8 |
| 2012/0130874 A1* | 5/2012 | Mane et al. | 705/34 |
| 2012/0131334 A1* | 5/2012 | Haikney et al. | 713/156 |
| 2012/0131341 A1* | 5/2012 | Mane et al. | 713/168 |
| 2012/0151209 A1* | 6/2012 | Visnyak et al. | 713/166 |
| 2012/0226903 A1* | 9/2012 | Durham et al. | 713/164 |
| 2013/0276068 A1* | 10/2013 | Alwar | 726/4 |
| 2014/0130128 A1* | 5/2014 | Mane et al. | 726/3 |

OTHER PUBLICATIONS

"Trusted Computing Platform Alliance (TCPA)", Main Specification, Version 1.1b, Published by the Trusted Computing Group, Feb. 22, 2002, 332 pages.

Marco Carvalho, "Subject Domain Organisation and Teaching Strategy for Distance Learning in the UnB Virtual Project", University of Brasilia, IEEE, 2002, pp. 327-330.

David Chaum, "Security Without Identification: Transaction Systems to Make Big Brother Obsolete", Communications of the ACM; Oct. 1985, vol. 28; Issue No. 10, pp. 1030-1044.

Micciancio et al., "Efficient and Concurrent Zero-Knowledge from any Public Coin HVZK Protocol", Electronic Colloquium on Computational Complexity, Report No. 45, Jul. 8, 2002, pp. 1-20.

(56) References Cited

OTHER PUBLICATIONS

Office Action received for U.S. Appl. No. 10/412,366, mailed on Oct. 13, 2006, 15 pages.
Office Action received for U.S. Appl. No. 10/412,366, mailed on Jan. 24, 2007, 10 pages.
Office Action received for U.S. Appl. No. 10/412,366, mailed on Jul. 3, 2007, 9 pages.
Office Action received for U.S. Appl. No. 10/412,366, mailed on Oct. 10, 2007, 9 pages.
Office Action received for U.S. Appl. No. 10/412,366, mailed on Jan. 15, 2008, 10 pages.
Office Action received for U.S. Appl. No. 10/744,193, mailed on Oct. 2, 2007, 16 pages.
Office Action received for U.S. Appl. No. 10/744,193, mailed on Sep. 3, 2008, 23 pages.
Office Action received for U.S. Appl. No. 10/744,193, mailed on Jul. 20, 2009, 26 pages.
Office Action received for U.S. Appl. No. 10/744,193, mailed on Aug. 31, 2010, 20 pages.
International Search Report & Written Opinion received for PCT Application No. PCT/US2004/007040, mailed on Mar. 14, 2005, 19 pages.
Prabhakaran et al., "Concurrent Zero Knowledge Proffs with Logarithimic Round-Complexity", May 6, 2002, 11 pages.
Schneier, Bruce: Applied Cryptography Protocols, Algorithms, and Source Code in C 2nd Edition, John Wiley & Sons, 1997; pp. 39 and 52-55.
Tung, "The Moron's Guide to Kerberos", Version 1.2.2, Published Dec. 2006, 11 pages.
Zemor, "Cours de Crytopgraphy", Published Nov. 2000, Cassinni, Paris, ISBN 2-844225-020-6, XP002313885, pp. 165-173.
International Preliminary Report on Patentability and Written Opinion received for PCT Application No. PCT/US2011/066014, mailed on Jul. 4, 2013, 6 pages.
Office Action received for Taiwan Patent Application No. 100147403, mailed on Jan. 8, 2014, 14 pages of English Translation and 8 pages of Taiwan Office Action.
Office Action received for U.S. Appl. No. 10/744,429, mailed on Dec. 29, 2006, 21 pages.
Office Action received for U.S. Appl. No. 10/744,429, mailed on Jul. 26, 2007, 20 pages.
Office Action received for U.S. Appl. No. 10/744,429, mailed on Feb. 4, 2008, 24 pages.
Office Action received for U.S. Appl. No. 10/744,429, mailed on Jul. 30, 2008, 23 pages.
Office Action received for U.S. Appl. No. 10/744,429, mailed on Jan. 2, 2009, 21 pages.
Notice of Allowance received for U.S. Appl. No. 10/744,429, mailed on Apr. 30, 2009, 20 pages.
Office Action received for U.S. Appl. No. 10/675,165, mailed on Oct. 17, 2006, 9 pages.
Office Action received for U.S. Appl. No. 10/675,165, mailed on Jul. 26, 2007, 8 pages.
Notice of Allowance received for U.S. Appl. No. 10/675,165, mailed on Nov. 30, 2007, 7 pages.
Office Action Received for Taiwan Patent Application No. 100147403, mailed on Apr. 22, 2014, 8 pages of Office Action Including 4 pages of English Translation.
Extended Search Report received for European Patent Application No. 11851559.2, mailed on Nov. 17, 2014, 8 pages.
Garfinkel et al., "Terra: A Virtual Machine-Based Platform for Trusted Computing", 2003, pp. 193-206.
McCune et al., "Trust Visor: Efficient TCB Reduction and Attestation" IEEE, 2010, pp. 143-158.
Sahita et al., "Dynamic Software Application Protection" Intel Corporation, 2009, 2 pages.
Extended European Search Report received for European Application No. 11851559.2, mailed on Nov. 17, 2014.
McCune, Jonathan M., Trust Visor: Efficient TCB Reduction and Attestation, IEEE Symposium on Security and Privacy, May 16, 2010, pp. 143-158, Piscataway, NJ, USA.
Garfinkel, Tal, Terra: A Virtual Machine-Based Platform for Trusted Computing, Proceedings of the ACM Symposium on Operating Systemsprinciples, Oct. 2003, pp. 193-206, Bolton Landing, NY, USA.
Sahito, Ravi, Dynamic Software Application Protection, 2009, Intel Corporation.
Office Action received for Chinese Patent Application No. 201180061987.2, mailed on Mar. 31, 2015, 12 pages, with list of cited art on p. 11.

* cited by examiner

SECURE APPLICATION ATTESTATION USING DYNAMIC MEASUREMENT KERNELS

FIELD

The present disclosure generally relates to the field of computing. More particularly, an embodiment of the invention generally relates to secure application attestation using dynamic measurement kernels.

BACKGROUND

As computer connectivity becomes more commonplace, securing computing devices from malicious entities, malware, etc. becomes a more challenging task. One way to increase security is to manage the privileged kernel of an operating system. As a result, ensuring the state of critical applications and being able to attest to their integrity to third parties may increase the security of the operating system as a whole.

Moreover, anti-virus software may be used for well-known types of attacks. However, such software is generally unable to address unknown threats or software that subverts the operating system and the services on which the anti-virus software depends.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Generally, applications that handle sensitive data require the ability to protect the data from malicious entities, as well as a mechanism to prove to third parties that the applications remain unmodified and/or operating correctly. In some implementations, secure application attestation is provided by using dynamic measurement kernels. In various embodiments, P-MAPS (Processor-Measured Application Protection Service), Secure Enclaves (SE), and/or combinations thereof provide dynamic measurement kernels to support secure application attestation. In one or more embodiments, P-MAPS provides virtualization based container(s), while SE provides solutions based on support features present in hardware. In turn, applications with requirements for establishing trust with a third party (such as anti-virus software, context protection systems, etc.) may make use of one or more of the embodiments discussed herein.

Figure 1:
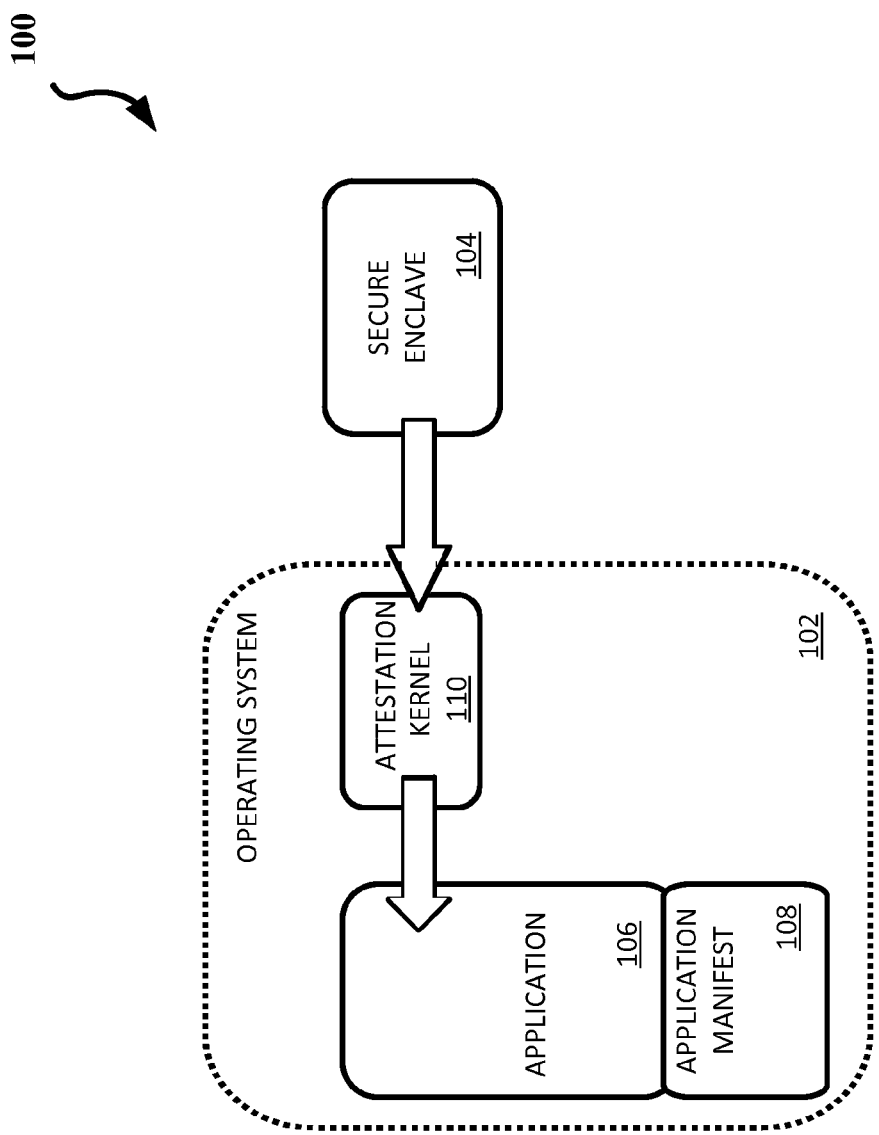
FIGS. 1 and 3 illustrate embodiments of systems in accordance with some embodiments of the invention.

More particularly, FIG. 1 illustrates a block diagram of a system 100 to provide secure application attestation, in accordance with an embodiment. The system 100 illustrates a system utilizing SE (which is available from Intel® Corporation). However, the embodiments discussed herein are not limited to SE and other technologies having the same or similar components may be used. As shown in FIG. 1, the system 100 includes an Operating System (OS) 102 and a Secure Enclave (SE) 104. The OS 102 includes an application 106 (with an application manifest 108) and an attestation kernel 110.

Figure 2:
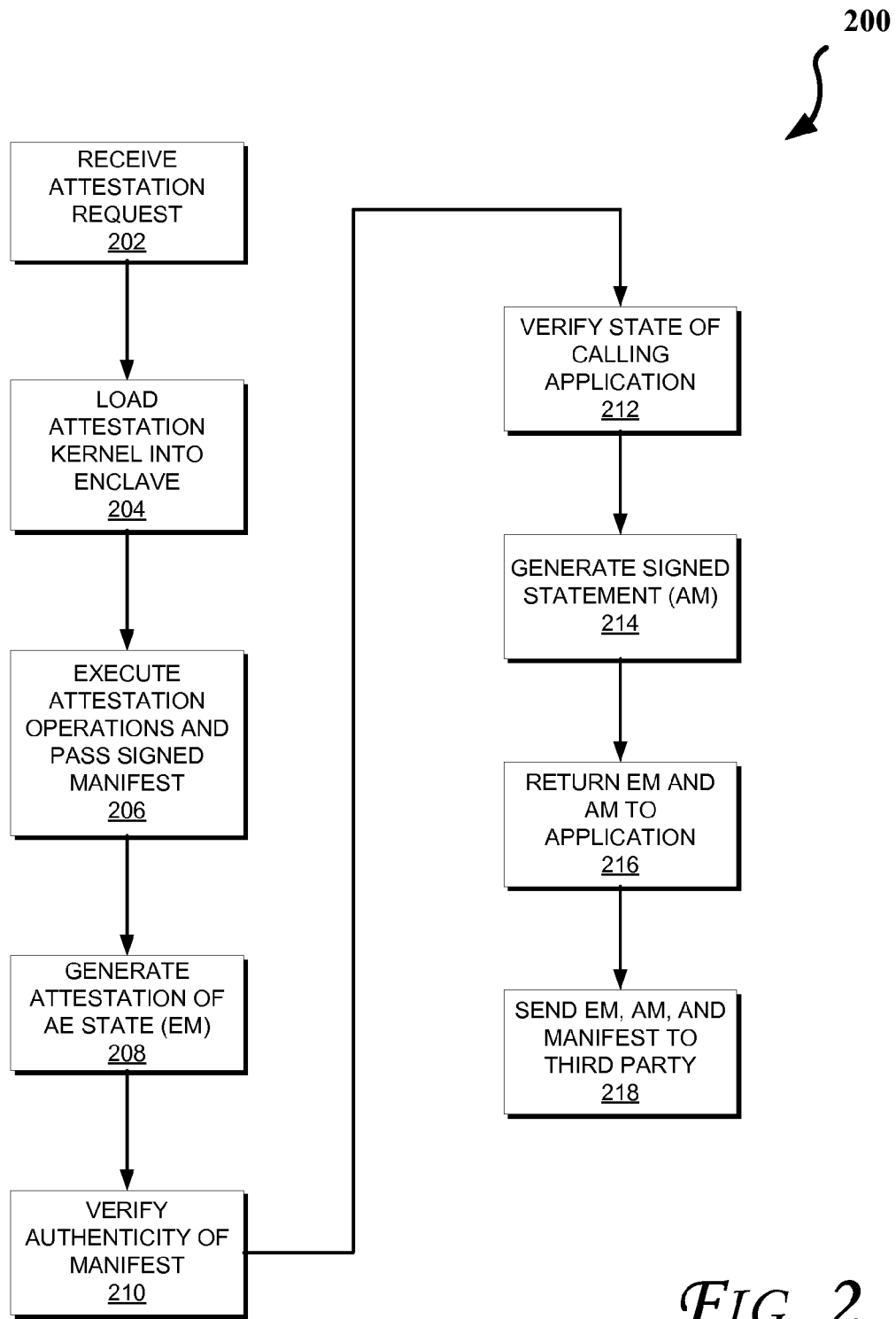
FIGS. 2, 4A and 4B illustrate flow diagrams of methods, according to some embodiments of the invention.

Referring to FIG. 2, a flow diagram of a method 200 to provide secure application attestation is illustrated, in accordance with an embodiment. In an embodiment, one or more of the components discussed with reference to FIG. 1 may be used to perform one or more of the operations discussed with reference to method 200.

More particularly, SE allows one or more pieces of an application to be isolated from the rest of the process (and potentially the rest of the system). For example, when code is loaded into an enclave, the processor measures the content. This measurement is then used to attest to the state of the enclave. Also, the measurement may be used to recheck the content of the enclave at a later time to detect unexpected changes. In some embodiments, code within the enclave is allowed to access memory outside of the enclave, but code outside of the enclave is not allowed to access memory within the enclave.

Referring to FIGS. 1-2, an application is allowed to generate an attestation of its state for verification by a third party using the method 200. At an operation 202, the application 106 receives an attestation request from a third party, e.g., including a random challenge nonce (CN) for freshness assurance and replay protection. At an operation 204, the application 106 loads (or causes loading of) an attestation kernel 110 into a storage unit such as an enclave (e.g., SE 104), also referred to as Attestation Enclave (AE).

At an operation 206, the application 106 executes (or through execution of the attestation kernel 110 causes execution of) the attestation-related operation(s) in the enclave (e.g., SE 104), e.g., passing a manifest signed by the application developer (or other trusted entity, such as an Information Technology (IT) department) and/or CN as parameter(s) in one or more embodiments.

At an operation 208, the AE (e.g., SE 104) generates an attestation of its own state—referred to as an Enclave Measurement (EM), e.g., which is cryptographically signed by the platform. At an operation 210, the AE verifies the authenticity of the manifest passed/generated at operation 206. At an operation 212, the AE uses the manifest contents to verify the state of the calling application by scanning memory, associated with the application, using the inside-out capabilities (i.e., where code within the enclave is allowed to access memory outside of the enclave, but code outside of the enclave is not allowed to access memory within the enclave).

At an operation 214, the AE generates a cryptographically signed statement—referred to as the Application Measurement (AM)—e.g., including a hash of the manifest and/or the nonce in one or more embodiments. At an operation 216, the AE returns the EM and AM to the application 106. The application sends the EM, AM, and manifest to the third party for verification at an operation 218.

Figure 3:
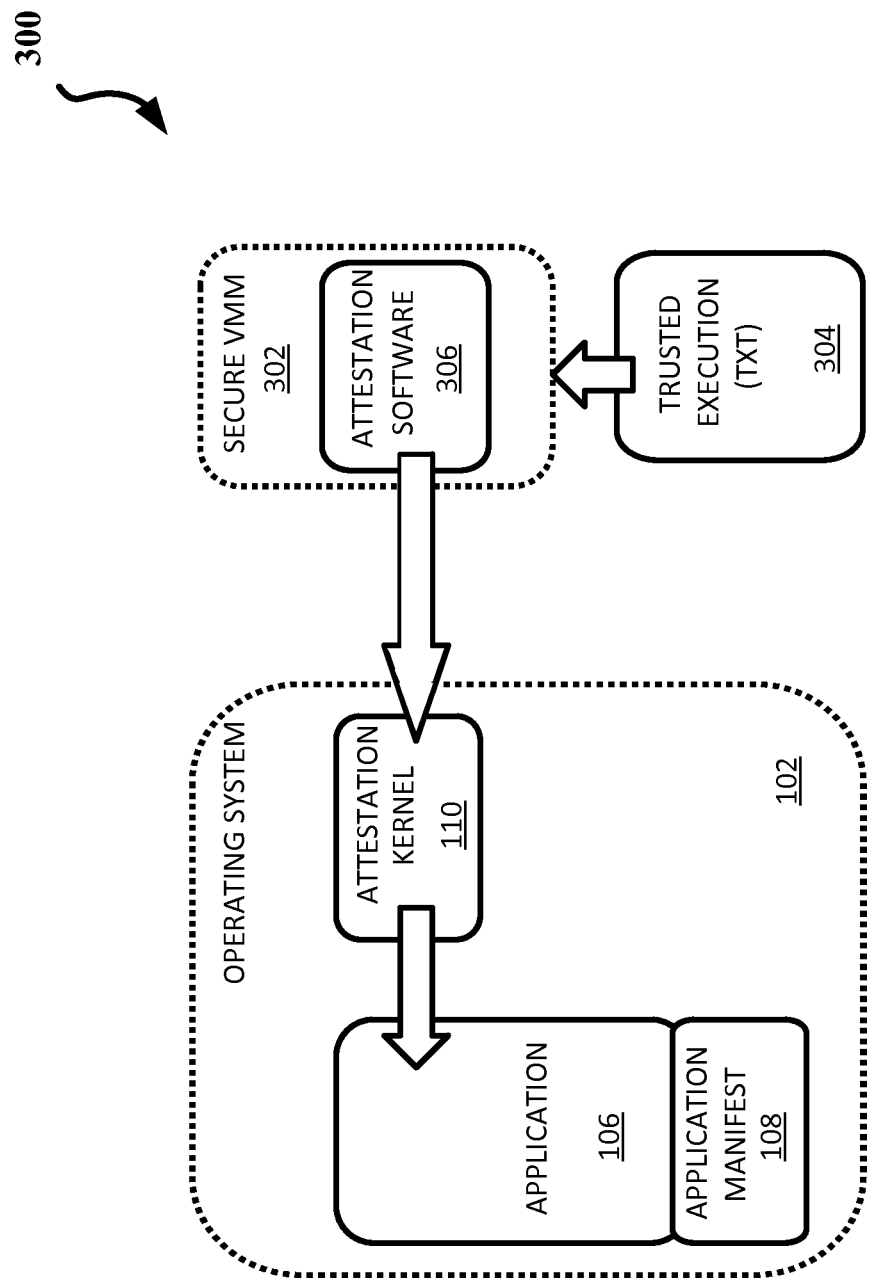

FIG. 3 illustrates a block diagram of a system 300 to provide secure application attestation, in accordance with an embodiment. The system 300 illustrates a system utilizing a variant of the P-MAPS virtualization based container technology (which is available from Intel® Corporation). However, the embodiments discussed herein are not limited to P-MAPS and other technologies having the same or similar components may be used. As shown in FIG. 3, the system 300 includes the Operating System (OS) 102, application 106, application manifest 108, attestation kernel 110, secure VMM (Virtual Machine Manager) logic 302 (including attestation software 306), and Trusted eXecution Technology (TXT) logic (which is available from Intel® Corporation) 304. However, the embodiments discussed herein are not limited to TXT and other technologies having the same or similar components may be used.

Figure 4A:
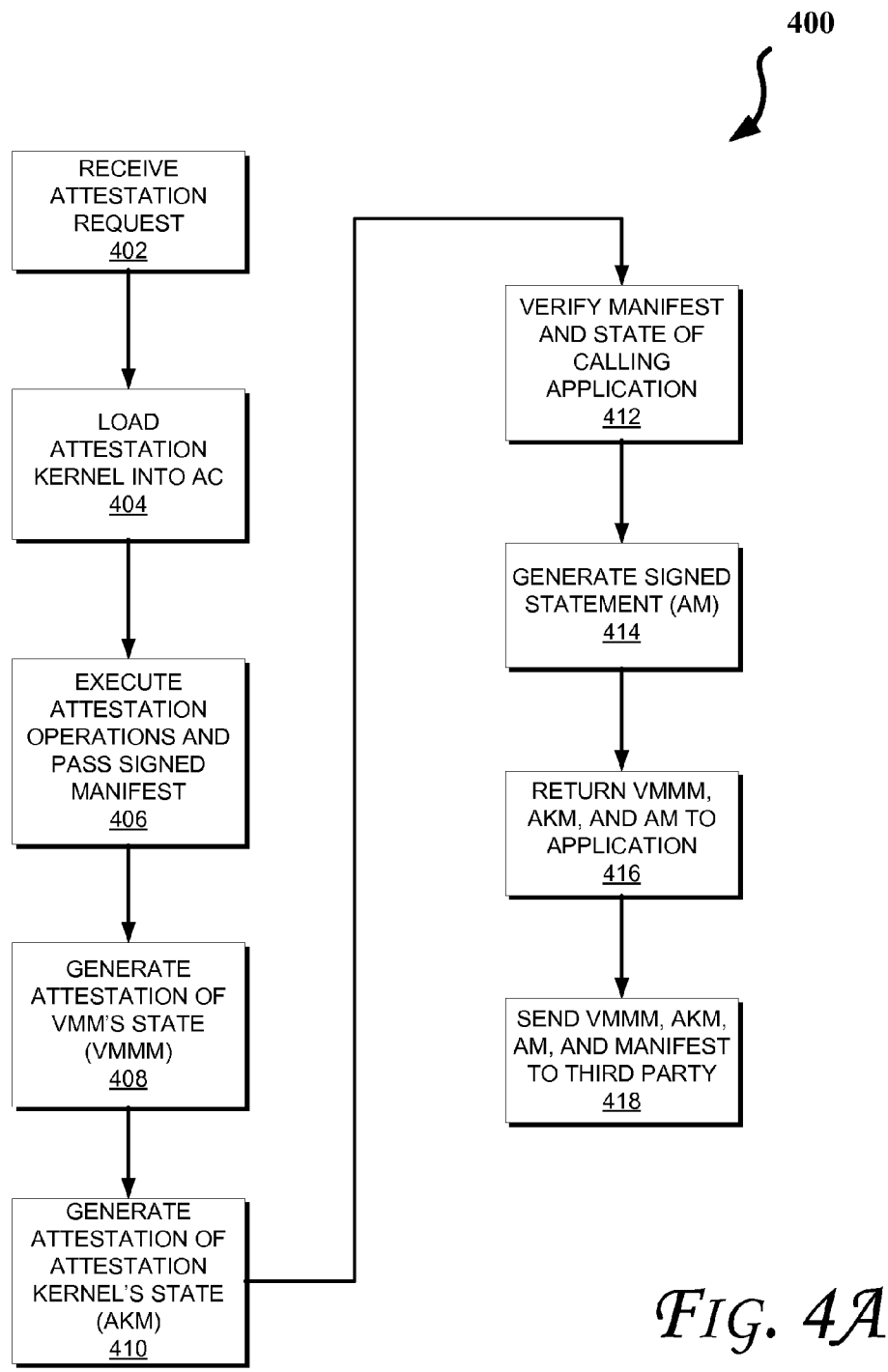

Referring to FIG. 4A, a flow diagram of a method 400 to provide secure application attestation is illustrated, in accordance with an embodiment. In an embodiment, one or more of the components discussed with reference to FIG. 3 may be used to perform one or more of the operations discussed with reference to method 400.

More particularly, a P-MAPS container may be implemented using a relatively small VMM based on Intel® virtualization technologies (e.g., VT-x, VT-d, TXT, etc.) in some embodiments. The container may envelop an entire application, preventing software access to memory, even from the OS kernel. The P-MAPS VMM in turn verifies that an application matches a signed manifest at the time it constructs a container for the application. The application may request an attestation of itself from the VMM at runtime. In an embodiment, the P-MAPS VMM is modified to behave more closely to an SE technology that is based on hardware features. The SE hardware technology is capable of constructing a container around portions of an application; potentially constructing multiple independent containers within the same application.

Referring to FIGS. 3-4A, an application is allowed to generate an attestation of its state for verification by a third party using the method 400. At an operation 402, the application 106 receives an attestation request from a third party, e.g., including a random CN for freshness assurance and replay protection. At an operation 404, the application 106 loads (or causes loading of) an attestation kernel (AK) 110 into a protected, attestable software container (AC), e.g., created by the secure VMM 302. In an embodiment, the VMM (e.g., secure VMM 302) checks the contents of the AK against a signed manifest at load time, e.g., using the attestation software 306.

At an operation 406, the application 106 executes (or through execution of the attestation kernel 110 causes execution of) the attestation-related operation(s) in the VMM and AK, e.g., passing a manifest signed by the application developer (or other trusted entity, such as an Information Technology (IT) department) and/or CN as parameter(s) in one or more embodiments.

At an operation 408, the AK requests an attestation of VMM's state from the VMM (e.g., secure VMM 302). In an embodiment, VMM uses a trusted hardware entity, such as a TPM (Trusted Platform Module) (which may also be used by the TXT 304), to provide quotes based on a secure measured launch of the VMM 302. The "quoted" attestation contains a measurement of the VMM's launch Measurement (VMMM) (which is cryptographically signed by the trusted hardware entity in an embodiment). In an embodiment, the trusted hardware entity (e.g., TPM) provides that measurement due to the measured launch of the VMM via TXT. At an operation 410, the VMM (e.g., secure VMM 302) rechecks/checks and/or issues/returns the measurement(s) of the AK—referred to as Attestation Kernel Measurement (AKM), e.g., which the VMM cryptographically signs to provide an attestation of the VMM. In one embodiment, the VMM 302 uses the attestation software 306 to generate a quote of the AK 110 previously loaded in an AC.

At an operation 412, the AK 110 verifies the application manifest authenticity and uses the manifest contents to verify the state of the calling application by scanning its memory, e.g., using the inside-out capabilities (i.e., where code within the AC is allowed to access memory outside of the AC, but code outside of the AC is not allowed to access memory within the AC).

At an operation 414, the AK 110 generates a cryptographically signed statement—referred to as the Application Measurement (AM)—e.g., including a hash of the manifest and/or the nonce in one or more embodiments. At an operation 416, the AC returns the VMMM, AKM, and AM to the application 106. The application sends the VMMM, AKM, AM, and manifest to the third party for verification at an operation 418.

In one or more embodiments, in addition to making the operation of the P-MAPS container mechanism closer to that of the SE based mechanism, the embodiments discussed herein may provide additional benefits including the ability to load multiple isolated containers from different authors, as well as a performance boost for code not located within a container. Also, hardware protected code is used to measure and attest to unprotected code within the same process in some embodiments.

Figure 4B:
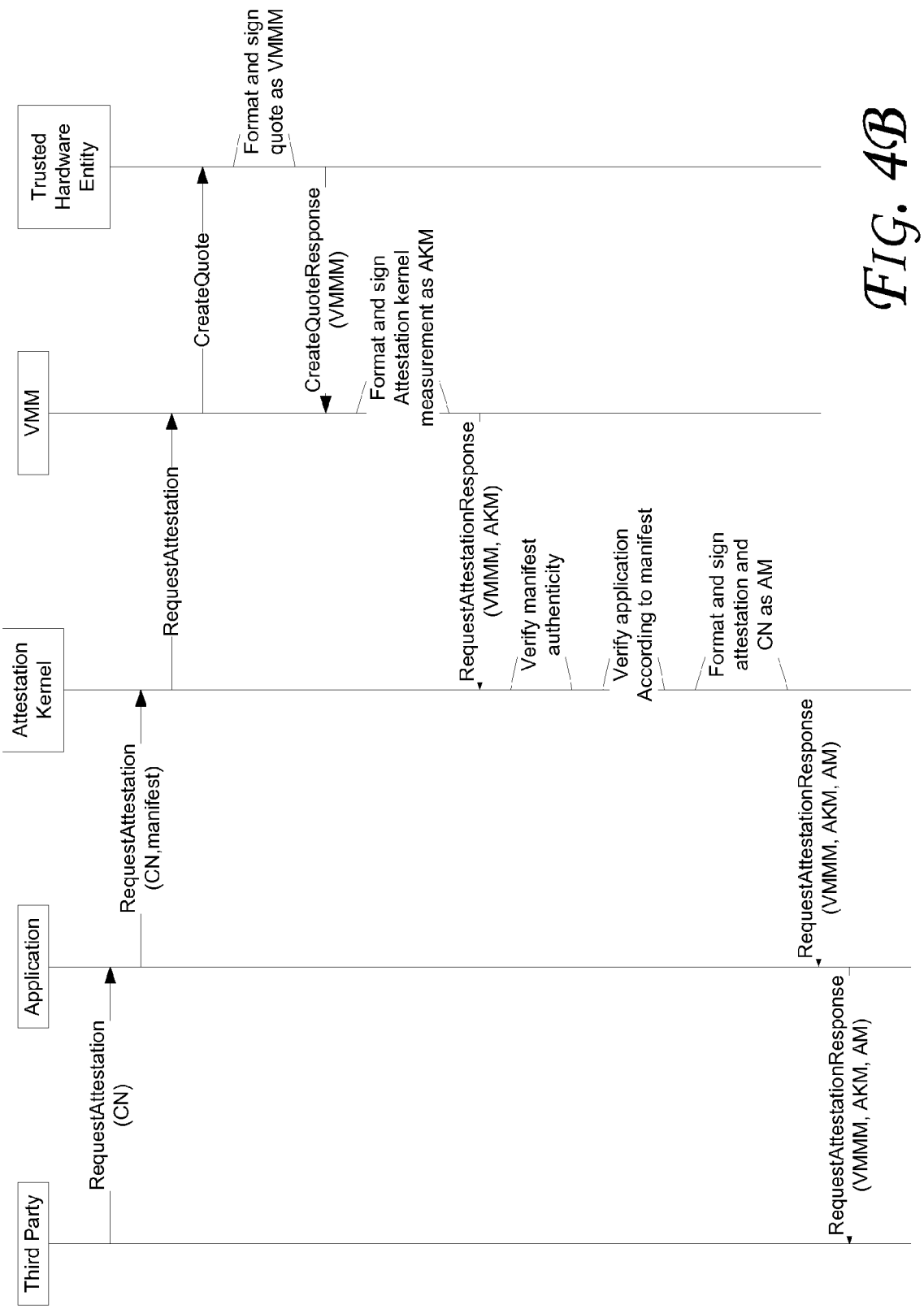

FIG. 4B illustrates a flow diagram of a method to provide secure application attestation, in accordance with an embodiment. In one embodiment, one or more of the components discussed with reference to FIG. 3 may be used to perform one or more of the operations discussed with reference to FIG. 4B.

As shown in FIG. 4B, a third party sends a request for attestation (including a CN), such as discussed with operation 402 of FIG. 4A. An application (such as application 106 of FIG. 3) then sends the request for attestation (including CN and a manifest such as discussed with reference to FIG. 4A) to an attestation kernel (such as the attestation kernel 110 of FIG. 3). The request is then forwarded to a VMM (such as the VMM 302 of FIG. 3). The VMM in turn utilizes a trusted hardware entity (such as TPM) to create a quote. The trusted hardware entity formats and signs the quote as VMMM. The generated quote (including VMMM) is forwarded to VMM. The VMM formats and signs an attestation kernel measurement as AKM and sends a response (including VMMM and AKM) to the attestation kernel. The attestation kernel verifies the manifest authenticity based on the response from VMM. The attestation kernel also verifies application according to the manifest. The attestation kernel formats and signs the attestation and CN as AM and sends a response to the application (including VMMM, AKM, and AM). In turn, the application responds to the third party with VMMM, AKM, and AM.

Figure 5:
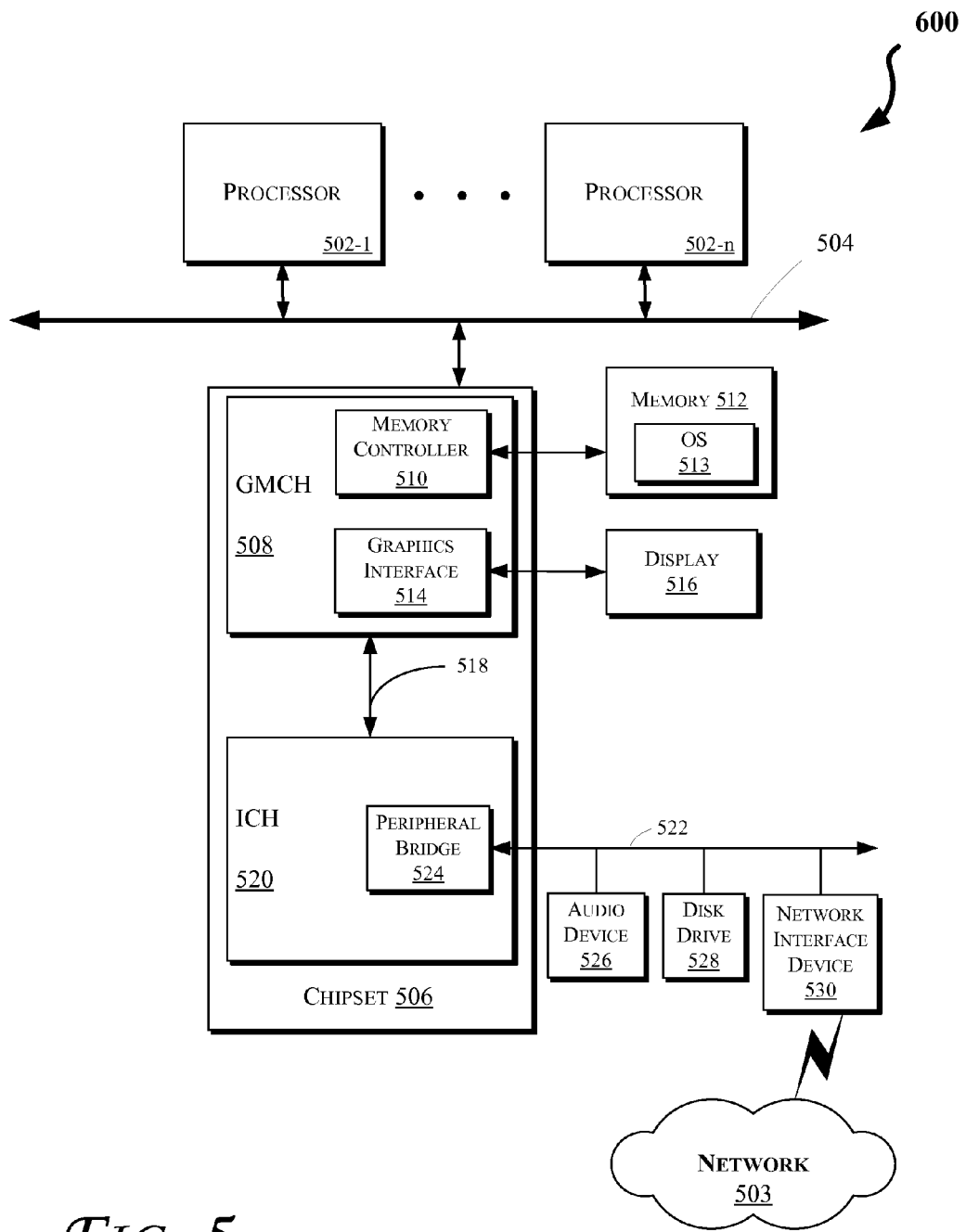
FIGS. 5 and 6 illustrate block diagrams of embodiments of computing systems, which may be utilized to implement some embodiments discussed herein.

FIG. 5 illustrates a block diagram of an embodiment of a computing system 500. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4, e.g., by processing instructions, executing subroutines, etc. in accordance with the operations discussed herein. Also, various storage devices discussed herein (e.g., with reference to FIGS. 5 and/or 6) may be used to store data, operation results, etc., including for example, the operating system 102 discussed with reference to FIGS. 1-4. In one embodiment, one or more processors (or other hardware components) discussed with reference to FIGS. 5-6 include one or more of the SE 104 of FIG. 1, secure VMM 302 of FIG. 3, and/or TXT 304 of FIG. 3.

More particularly, the computing system 500 may include one or more central processing unit(s) (CPUs) 502 or processors that communicate via an interconnection network (or bus) 504. Hence, various operations discussed herein may be performed by a CPU in some embodiments. Moreover, the processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Moreover, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the CPU 502, or any other device included in the computing system 500. In an embodiment, the memory 512 may store an operating system 513, which may be the same or similar to the OS 102 of FIGS. 1-4. Same or at least a portion of this data (including instructions) may be stored in disk drive 528 and/or one or more caches within processors 502. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display 516. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516. In some embodiments, the processors 502 and one or more other components (such as the memory controller 510, the graphics interface 514, the GMCH 508, the ICH 520, the peripheral bridge 524, the chipset 506, etc.) may be provided on the same IC die.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530, which may be in communication with the computer network 503. In an embodiment, the device 530 may be a NIC capable of wireless communication. Other devices may communicate via the bus 522. Also, various components (such as the network interface device 530) may communicate with the GMCH 508 in some embodiments of the invention. In addition, the processor 502, the GMCH 508, and/or the graphics interface 514 may be combined to form a single chip.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
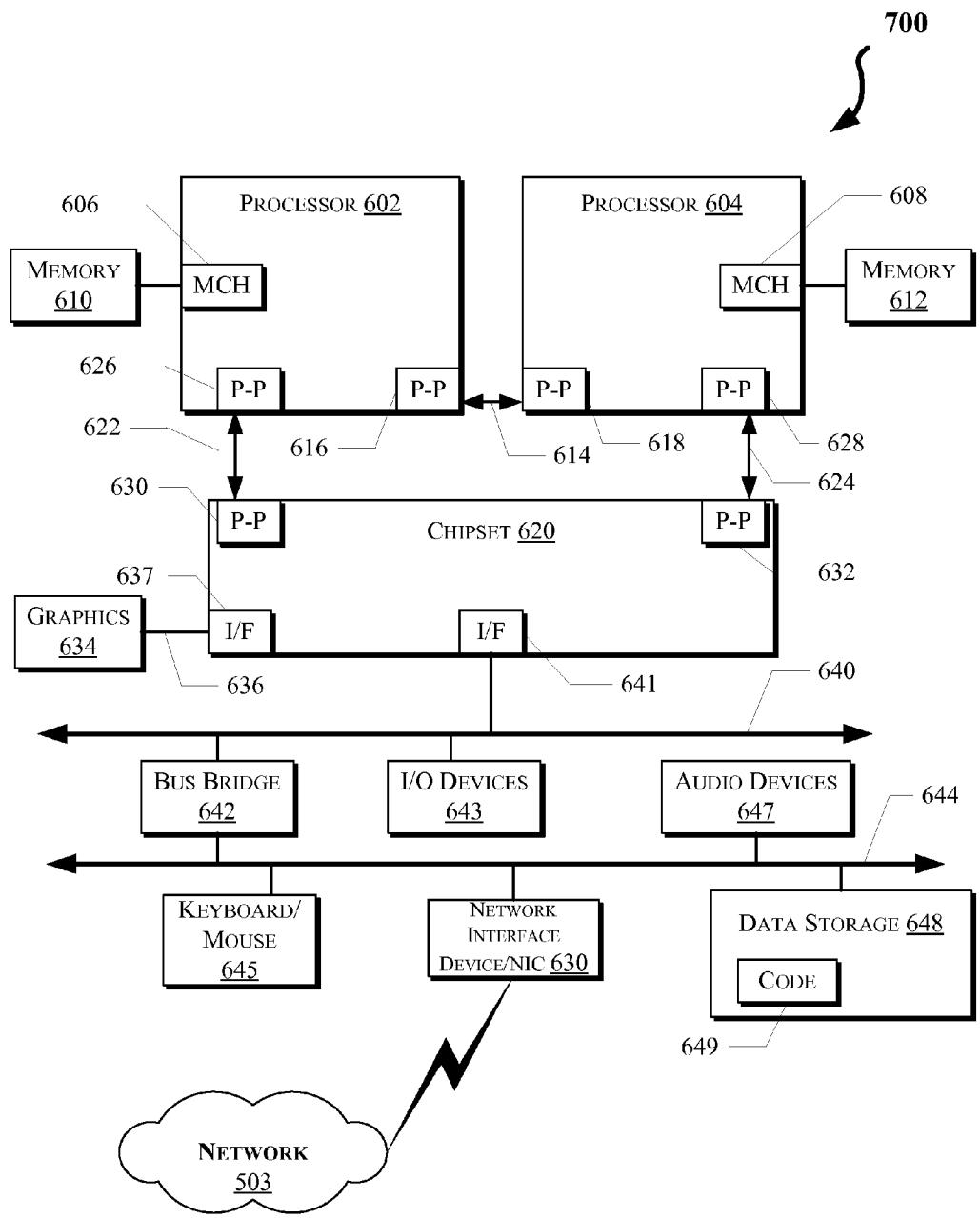

More specifically, FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 (which may be the same or similar to the GMCH 508 of FIG. 5 in some embodiments) to couple with memories 610 and 612. The memories 610 and/or 612 may store various data such as those discussed with reference to the memory 512 of FIG. 5.

The processors 602 and 604 may be any suitable processor such as those discussed with reference to the processors 602 of FIG. 6. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 630 discussed with reference to FIG. 6 (such as modems, network interface cards (NICs), or the like that may be coupled to the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software (including, for example, micro-code that controls the operations of a processor such as the processors discussed herein), firmware, or combinations thereof, which may be provided as a computer program product, e.g., including a tangible (e.g., non-transitory) machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
    receiving an attestation request at an application from a third party;
    loading an attestation kernel into a storage unit in response to the attestation request, wherein code stored in the storage unit is allowed to access memory outside of the storage unit whereas code stored outside of the storage unit is blocked from accessing any memory location in the storage unit;
    executing one or more operations at hardware logic, corresponding to the attestation request and in accordance with data stored in the storage unit, to generate a manifest, wherein the hardware logic executes the one or more operations in response to a transmission from a virtual machine manager logic, wherein the transmission is generated by the virtual machine manager logic in response to the attestation request;
    generating an attestation of data stored in the storage unit;
    verifying a state of the application based on the generated attestation of the data stored in the storage unit and the manifest;
    generating a statement of application measurement based on a hash of the manifest; and
    transmitting the application measurement, the manifest, and the attestation data to both the application and the third party.

2. The method of claim 1, wherein the storage unit is one of an attestation enclave or an attestation container.

3. The method of claim 1, wherein verifying the state of the application is to comprise scanning memory associated with the application.

4. The method of claim 1, further comprising a virtual machine monitor checking the attestation of the data stored in the storage unit and issuing a measurement of the data stored in the storage unit, wherein the transmitting is to transmit the measurement of the data stored in the storage unit.

5. The method of claim 1, further comprising a virtual machine monitor checking the attestation of the data stored in the storage unit and issuing a measurement of the data stored in the storage unit, wherein the transmitting is to transmit the measurement of the data stored in the storage unit and a quote generated by a trusted hardware entity.

6. The method of claim 1, wherein verifying the state of the application is to comprise scanning memory associated with the application and wherein code within the storage unit is allowed to access memory outside of the storage unit.

7. The method of claim 1, wherein executing the one or more operations is to be performed based on the attestation kernel.

8. The method of claim 1, wherein the manifest is comprise a random challenge nonce.

9. The method of claim 1, wherein the manifest is to be signed by a trusted entity.

10. The method of claim 1, further comprising cryptographically signing the attestation of the data stored in the storage unit.

11. A non-transitory computer-readable medium comprising one or more instructions that when executed on a processor configure the processor to perform one or more operations to:
    receive an attestation request at an application from a third party;
    load an attestation kernel into a storage unit in response to the attestation request, wherein code stored in the storage unit is allowed to access memory outside of the storage unit whereas code stored outside of the storage unit is blocked from accessing any memory location in the storage unit;

execute one or more operations, corresponding to the attestation request and in accordance with data stored in the storage unit, to generate a manifest, wherein the processor executes the one or more operations in response to a transmission from a virtual machine manager logic, wherein the transmission is generated by the virtual machine manager logic in response to the attestation request;

generate an attestation of data stored in the storage unit;

verify a state of the application based on the generated attestation of the data stored in the storage unit and the manifest;

generate a statement of application measurement based on a hash of the manifest; and transmit the application measurement, the manifest, and the attestation data to both the application and the third party.

12. The computer-readable medium of claim 11, further comprising one or more instructions that when executed on a processor configure the processor to perform one or more operations to scan memory associated with the application.

13. The computer-readable medium of claim 11, further comprising one or more instructions that when executed on a processor configure the processor to perform one or more operations to check, by a virtual machine monitor, the attestation of the data stored in the storage unit and to issue a measurement of the data stored in the storage unit.

14. The computer-readable medium of claim 11, further comprising one or more instructions that when executed on a processor configure the processor to perform one or more operations to check, by a virtual machine monitor, the attestation of the data stored in the storage unit and to issue a measurement of the data stored in the storage unit.

15. The computer-readable medium of claim 11, further comprising one or more instructions that when executed on a processor configure the processor to perform one or more operations to scan memory associated with the application and wherein code within the storage unit is allowed to access memory outside of the storage unit, while code outside of the storage unit is prevented from accessing the data stored in the storage unit.

16. The computer-readable medium of claim 11, wherein the storage unit is one of an attestation enclave or an attestation container.

17. The computer-readable medium of claim 11, wherein the manifest is comprise a random challenge nonce.

18. The computer-readable medium of claim 11, further comprising one or more instructions that when executed on a processor configure the processor to perform one or more operations to cryptographically sign the attestation of the data stored in the storage unit.

19. The computer-readable medium of claim 11, further comprising one or more instructions that when executed on a processor configure the processor to perform one or more operations to transmit the manifest, the application measurement, and the attestation data to the third party.

20. A system comprising:

memory to store one or more instructions corresponding to a container; and a processor, having hardware logic, to execute the one or more instructions to:

receive an attestation request at an application from a third party;

load an attestation kernel into a storage unit in response to the attestation request, wherein code stored in the storage unit is allowed to access memory outside of the storage unit whereas code stored outside of the storage unit is blocked from accessing any memory location in the storage unit;

execute one or more operations, corresponding to the attestation request and in accordance with data stored in the storage unit, to generate a manifest, wherein the processor executes the one or more operations in response to a transmission from a virtual machine manager logic, wherein the transmission is generated by the virtual machine manager logic in response to the attestation request;

generate an attestation of data stored in the storage unit;

verify a state of the application based on the generated attestation of the data stored in the storage unit and the manifest;

generate a statement of application measurement based on a hash of the manifest; and transmit the application measurement, the manifest, and the attestation data to both the application and the third party.

21. The system of claim 20, wherein the storage unit is one of an attestation enclave or an attestation container.

22. The system of claim 20, further comprising a virtual machine monitor to check the attestation of the data stored in the storage unit and issue a measurement of the data stored in the storage unit.

23. The system of claim 20, further comprising a trusted entity to sign the manifest.

24. The system of claim 23, wherein the trusted entity is a trusted platform module.

25. The system of claim 20, further comprising logic to cryptographically sign the attestation of the data stored in the storage unit.

26. The system of claim 20, further comprising logic to transmit the manifest, the application measurement, and the attestation data to the third party.

27. The system of claim 20, wherein the manifest is comprise a random challenge nonce.

28. The system of claim 20, further comprising logic to transmit the measurement of the data stored in the storage unit and a quote generated by a trusted hardware entity.

* * * * *